US008096437B1

(12) United States Patent
Ryan

(10) Patent No.: US 8,096,437 B1
(45) Date of Patent: Jan. 17, 2012

(54) DISPOSABLE, ABSORBENT, STEAM-PERMEABLE, SEGMENTED COOKING UTENSIL COVER

(76) Inventor: Gregory Carl Ryan, Saratoga, WY (US)

( * ) Notice: Subject to any disclaimer, the term of this patent is extended or adjusted under 35 U.S.C. 154(b) by 258 days.

(21) Appl. No.: 12/505,688

(22) Filed: Jul. 20, 2009

(51) Int. Cl.
*B65D 51/16* (2006.01)

(52) U.S. Cl. .................. 220/370; 220/573.1; 220/731; 220/819; 220/822; 220/826; 220/912; 96/148

(58) Field of Classification Search .............. 99/148; 126/299 C; 220/88.1, 88.2, 369, 370, 524, 220/573.1, 731, 819, 822, 826, 912; 96/148
See application file for complete search history.

(56) References Cited

U.S. PATENT DOCUMENTS

| | | | | |
|---|---|---|---|---|
| 287,425 | A | * | 10/1883 | Dowdell ........................ 220/372 |
| 2,587,773 | A | * | 3/1952 | Sell et al. ........................ 96/148 |
| 2,664,169 | A | | 12/1953 | Misener et al. |
| 2,749,198 | A | * | 6/1956 | Berber ........................ 312/249.1 |
| 2,770,389 | A | * | 11/1956 | Drakoff ........................... 99/341 |
| 2,887,154 | A | * | 5/1959 | Morningstar et al. ........ 160/351 |
| 3,144,152 | A | * | 8/1964 | Kopp ................................ 215/6 |
| 3,343,345 | A | * | 9/1967 | Carolan ........................... 55/511 |
| 3,363,406 | A | | 1/1968 | Miller |
| 3,528,236 | A | * | 9/1970 | Merrick ........................... 96/148 |
| 3,856,176 | A | * | 12/1974 | Carter ............................ 220/200 |
| 4,108,332 | A | | 8/1978 | Thompson |
| 4,258,694 | A | | 3/1981 | Kato |
| 4,298,135 | A | * | 11/1981 | Vossen .............................. 96/148 |
| 4,396,142 | A | * | 8/1983 | Lines et al. .............. 220/560.01 |
| 4,422,560 | A | | 12/1983 | Solomon |
| D278,513 | S | * | 4/1985 | Ebeling et al. ............. D3/203.3 |
| 4,521,233 | A | | 6/1985 | Vossen |
| 4,801,773 | A | | 1/1989 | Hanlon |
| 4,989,748 | A | | 2/1991 | Parr, Jr. et al. |
| D321,788 | S | * | 11/1991 | Chen ............................... D3/295 |
| 5,542,347 | A | | 8/1996 | Joseph |
| 5,724,885 | A | | 3/1998 | Uy |
| 5,762,199 | A | * | 6/1998 | Aguilera ........................ 206/533 |
| 5,957,278 | A | * | 9/1999 | Krawec et al. ................ 206/223 |
| 6,056,146 | A | * | 5/2000 | Varakian et al. .............. 220/370 |
| 6,068,158 | A | * | 5/2000 | Chabout ........................ 221/113 |
| 6,189,722 | B1 | * | 2/2001 | Ason ........................... 220/573.1 |
| D463,102 | S | * | 9/2002 | Rosado et al. .............. D3/203.3 |

(Continued)

FOREIGN PATENT DOCUMENTS

| | | |
|---|---|---|
| GB | 2369035 A | 5/2002 |
| GB | 2369035 B | 6/2005 |
| GB | 2427875 B | 1/2009 |
| WO | WO9802074 | 1/1998 |
| WO | WO2005041619 | 5/2005 |

*Primary Examiner* — J. Gregory Pickett
*Assistant Examiner* — Ned A Walker
(74) *Attorney, Agent, or Firm* — Lee G. Meyer, Esq.; Meyer & Associates, LLC

(57) ABSTRACT

A disposable, segmented, sorbent, steam-permeable, cooking utensil cover for selectively covering foodstuffs in a stovetop cooking utensil, having upstanding sidewalls which terminate at a rim. The cover has sufficient wet-strength to render it rigid. The edge of the cover contacts the rim of the cooking utensil to cover contained foodstuffs and support the rigid cover. The cover is made of steam-permeable, sorbent, fire-retardant material to allow cooking steam to escape, while grease spatter and cooking juices are absorbed; and, to prevent combustion of the cover due to its proximity to the stove heating element. The cover contains a plurality of radial slits to form liftable segments hinged at the cover center to allow independent elevation of a selected segment. A flip-up handle for removing the cover and adhesive lift tabs to facilitate lifting and securing the segments are provided. Once utilized, the entire cover assembly is discarded.

10 Claims, 1 Drawing Sheet

U.S. PATENT DOCUMENTS

| | | | |
|---|---|---|---|
| D488,618 S * | 4/2004 | Wekstein | D3/203.3 |
| D563,095 S * | 3/2008 | Sabbag | D3/203.3 |
| 2003/0205575 A1 | 11/2003 | DeWinter | |
| 2004/0164074 A1 | 8/2004 | Newton | |
| 2004/0195238 A1* | 10/2004 | Brija | 220/254.3 |
| 2005/0051345 A1* | 3/2005 | Calderwood et al. | 169/49 |
| 2005/0051542 A1 | 3/2005 | Boyd | |
| 2005/0269237 A1* | 12/2005 | Tung et al. | 206/534 |
| 2006/0093788 A1 | 5/2006 | Behm et al. | |
| 2006/0151489 A1 | 7/2006 | Hellmann et al. | |
| 2006/0213905 A1 | 9/2006 | Shaw et al. | |

* cited by examiner

DISPOSABLE, ABSORBENT, STEAM-PERMEABLE, SEGMENTED COOKING UTENSIL COVER

BACKGROUND

The present application relates to a cooking utensil cover; and, more particularly a disposable, steam-permeable, fire-retardant, sorbent, segmented lid for covering a stovetop cooking utensil.

Foods prepared on a conventional cooking surface having a heating element, such as a stove, are usually cooked and/or contained within a cooking utensil, such as a frying pan, griddle, or the like which is adapted to be placed proximate a stovetop heating element and has a cooking platform with connected upstanding sidewalls which terminate at a rim. These utensils are traditionally covered by a solid non-porous metallic, glass, or ceramic cooking cover or lid to prevent cooking spatter, generated when using higher temperatures for cooking. This is especially true when frying meat or preparing those foods cooked with oil, since these food items tend to spatter grease and/or cooking juices. In the absence of this cover, the grease/cooking juice spatter tends to cover the cooking surface and the surrounding area. In cases of enclosed burner elements this spatter burns onto the cooking surface, making clean up difficult. In the case of an open burner, or flame, the grease can actually ignite. Even a non-metallic cover, because of the proximity of grease and heating element, is not adequate in that it is easily ignitable. Thus, many of the current covers for use in microwave ovens are not adaptable for use on a stovetop heated element.

These non-porous cooking covers or lids, although effective against spatter, prevent steam generated during cooking from escaping. The ability for steam to escape the cooking utensil is a desirable part in preparing many foods. Porous "screens" have been used for this purpose, but they allow all the steam to escape along with entrained grease. Additionally, these screen-type lids or cooking covers need to be washed requiring additional clean-up. More importantly, certain food items emit steam during cooking which at least partially needs to escape from the utensil to prevent pressure build-up; yet, they require at least a partial retention of the steam to properly cook the food. Attempts to meet this requirement have met with limited success. Some have proposed a non-absorbent, porous or sintered glass material that allows the partial egress of vaporized liquids along with entrained grease. Others have proposed absorbent lids which allow absorption of grease. However, prior art covers of lids that are absorbent are supported on a frame making at least part of the cover non-disposable.

Many times, one desires to cook more than a single food item in a single utensil, such as, for example, bacon, eggs, and potatoes, each with different cooking duration and preparation, including differing the required duration of covering. Some of these food items, and especially those which involve grease in their preparation or expel grease during cooking, need to be covered entirely, while others do not.

It, therefore, would be desirable to have a rigid, steam-permeable, sorbent, and completely disposable, fire-resistant, lid or cover for a cooking utensil designed for use on a heated stovetop which contained individual segments, each having a bendable interface, that can be independently elevated to allow the covering of certain foods during preparation, but provide for the uncovering selected foodstuffs in the same cooking utensil.

SUMMARY

In the broad aspect, a rigid, steam-permeable, absorbent, completely disposable, segmented, fire-resistant stovetop utensil cover comprises a rigid body, configured to completely cover the cooking utensil to be covered. The cover body is constructed of a fire-resistant, steam-permeable, absorbent, fibrous material of a dimension slightly greater than the utensil to be covered having a center portion and at least four independent segments or sections having a hinged or bendable interface with a center portion to allow independent elevation of each segment to uncover a corresponding portion of the cooking utensil as desired. In one embodiment, the center portion of the cover body is reinforced to provide greater stability. In another embodiment, the cover body is constructed of multiple layers of bonded absorbent, steam-permeable paper material having aligned fiber wherein the alignment of the fiber of each layer is at an oblique angle to that of both the previous and subsequent layer to increase wet strength and, therefore, rigidity. In this configuration, at least the top and bottom layers are treated with a fire-retardant material, which is non-toxic for culinary use. In another embodiment, the center portion contains a handle to place and remove the cooking utensil cover, which is, for example, a flip-up handle of cover body material. In a further embodiment, lift-tab fasteners are affixed on each segment at the periphery thereof to facilitate lifting the segment and securing it in the elevated position.

In operation, the peripheral portions of the cover body rest upon the rim of the upstanding walls of the cooking utensil to completely cover the contents therein. As the food within the cooking utensil cooks, the cover absorbs spatters, preventing them from exiting the cooking utensil. Steam generated by cooking is partially allowed to escape through the porous material, while the entrained grease is absorbed and/or adsorbed by the cooking utensil cover. At one or more appropriate times, a segment of the cooking utensil cover may be lifted to expose a portion of the cooking food to atmosphere. It may be left in that configuration for the duration of cooking or replaced to its original position as the cooking procedure for the particular food require.

BRIEF DESCRIPTION OF THE FIGURES

Exemplary embodiments are illustrated in referenced figures of the drawings. It is intended that the embodiments and figures disclosed herein are to be considered illustrative and exemplary rather than limiting. The features and advantages of the present invention, without limitation, are hereinafter described in the following detailed description of exemplary embodiments to be read in conjunction with the accompanying drawing figures and will be apparent to one skilled in the art that other embodiments are included, in view of the following, wherein like reference numerals are used to identify the same or similar parts in the similar views. However, it should be understood that use of like numerals for identification herein is not to be construed as an acknowledgement or admission that such features are necessary equivalent. It is also to be understood that where a plurality of similar features are depicted, not all of such identical features may be numerically labeled on the figures.

DISCUSSION OF THE NOMENCLATURE

Figure 1:
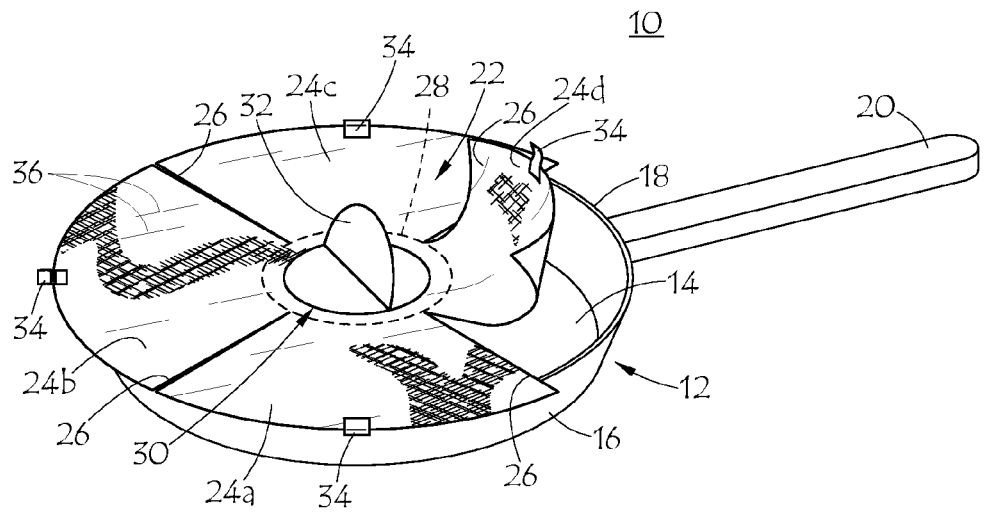
FIG. 1 is a perspective view of the disposable, segmented, steam-permeable, absorbent cover in place upon a conventional frying pan with one segment elevated.

"Aligned fibers" means the property of a porous material wherein the fibers making up the material are substantially parallel one to the other, also known as the "grain" in paper products.

"Fire-retardant" means a property of a substance of material which prevents the material from igniting, charring, or otherwise combusting in the presence of a radiant heat source and is used interchangeably with fire-resistant.

"Rigid" means having a property of material which allows for support of at least the weight of the material across an opening.

"Steam-permeable" means a structure which has porosity which retards the egress of hot cooking grease, yet allows at least some steam to escape.

"Sorbent" means a material which, owing to an affinity for certain substances, extracts one or more such substances from a liquid or gas with which it is in contact, and which changes physically or chemically, or both, during the process. As used herein, this term is meant to cover the term "adsorbent," as well as "absorbent."

"Wet Strength" means the ability of an object to retain rigidity when substantially saturated with liquid.

DETAILED DESCRIPTION

All of the methods and apparatus disclosed and claimed herein can be made and executed without undue experimentation in light of the present disclosure. While the methods and apparatus have been described in terms of embodiments, it will be apparent to those of skill in the art that variations may be applied to the methods and apparatus and in the steps or in the sequence of steps of the methods described herein without departing from the concept, spirit, and scope of the invention. Various substitutions can be made to the material and configurations described without departing from the spirit of the claimed invention. All such similar substitutes and modifications apparent to those skilled in the art are deemed to be within the spirit, scope, and concept of the claimed invention.

The instant cooking utensil cover is adapted to provide a multi-purpose, completely disposable cover or lid for stovetop cooking utensils, such as frying pans, grills, and the like. Such cooking utensils have a cooking platform adapted to contact (or be in proximity) to a stovetop heating element and have contiguous, upstanding sidewalls terminating at a rim to define a volume which can be covered without touching the food being prepared therein. The instant cooking utensil cover is steam-permeable or steam-penetratable, as well as being sorbent, so that foodstuffs expelling gaseous water vapor (steam) can be prepared with at least a portion of the steam being allowed to escape, while the fat and moisture spatters are absorbed and/or adsorbed into the disposable cooking cover to prevent their egress from the cooking utensil. Thus, this sorption traps liquid spatter (grease and juices), while allowing at least a portion of the steam vapor to escape. This is in contrast to solid, non-porous, non-absorbent covers which prevent the vapors from escaping and allow the grease and the moisture to run down the walls of the cooking utensil at the inter-surface of the rim or screens which allow the escape of steam carrying entrained micelle of grease or oil.

The instant cooking utensil cover is segmented in at least four segments, each of such segments being able of hinged elevation to expose the corresponding portion of the interior of the cooking utensil, thereby exposing the foodstuffs contained within that portion of the cooking utensil. In this manner, various foodstuffs can be cooked in the cooking utensil simultaneously, while providing independent covering or uncovering of selected items as desired for preparation.

Advantageously, the cooking utensil cover is formed of a single cover body of flame-resistant, absorbent, steam-permeable material, which advantageously contains fibers that can be aligned one with another (grain) to increase the Wet Strength and Rigidity of the material. In one embodiment, the contiguous cover body material contains slits running from a point proximate the center to the periphery of the cover body, thereby forming at least four independent pie-shaped sections or segments. By employing this method, the segment attached to the center portion forms a hinged or bendable interface, such that each segment can be lifted at the hinged interface to maintain an elevated position. That is, the four slits do not intersect one another such that the bendable interface is inherently provided. In this manner, the segments can be selectively and independently lifted, one segment at a time, to uncover portions of the cooking utensil as food is being prepared.

The cooking utensil cover is of sufficient area to completely cover the cooking utensil such that the periphery of the underside of the cooking utensil cover rests upon the cooking utensil rim and is of a dimension such that the entire under-periphery of the cooking utensil cover rests on the rim of the cooking utensil to cover the entire cooking utensil volume. The cooking utensil cover may be in any shape, but is advantageously in a shape that is similar to the shape of the cooking utensil to be covered.

Turning to FIG. 1, there is shown a disposable, segmented cooking utensil cover 10, disposed on a conventional cooking utensil 12. Specifically, cooking utensil 12 contains a cooking platform 14 having contiguous, upstanding sidewalls 16 terminating at rim 18 and having a handle 20 for placing and removing the cooking utensil 12 from a stovetop heating element, not shown. Cooking utensil cover 10 comprises a steam-permeable, fire-resistant, sorbent, rigid cover body 22 having four segmented portions 24a, 24b, 24c, and 24d which are formed in cover body 22 by means of slits 26 which penetrate the cover body 22 from the top surface to the bottom surface, as better seen in FIG. 2. Each segment (24a, 24b, 24c, and 24d) forms a hinged or bendable interface 28 with center portion 30 to allow independent elevation of each segment, one to the other. Attached to center portion 30 there is a flip-up handle 32. Attached to each of the segments 24a, 24b, 24c, and 24d is an adhesive lift tab 34.

In operation, as shown in FIG. 1, a segment (segment 24d in FIG. 1) is lifted by means of adhesive lift tab 34 and folded back at the bendable interface 28 to expose the corresponding portion of the cooking platform 14. The adhesive lift tab 34 can be secured to the flip-up handle 32 to retain segment 24d in its elevated position. Flip-up handle 32 is used for placing and removing the cover body 22 upon cooking utensil 12. As can be seen, the cover body 22 has a radial dimension slightly greater than the diameter of cooking utensil 12, such that the under portion of cover body 22 rests upon rim 18 to completely cover the entirety of the cooking platform 14 when none of the segments are in a lifted position.

Figure 2:
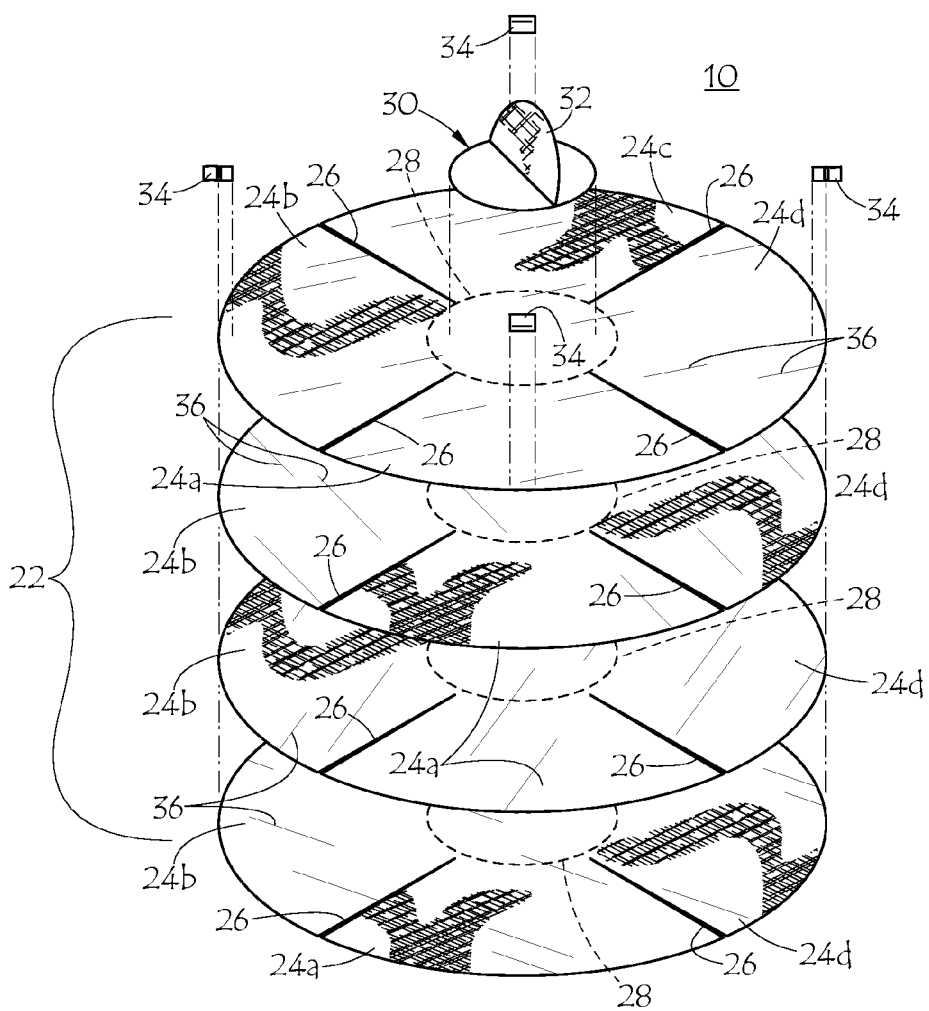
FIG. 2 is an exploded view of the disposable, segmented, steam-permeable, absorbent lid shown in FIG. 1, without segment elevation.

The cover body 22 is advantageously formed of layered porous material such as, for example, filter paper, wherein each layer is bonded to the layer immediately proximate to form a layered cover body. As shown in FIG. 2, which is an exploded view of the cooking utensil cover shown in FIG. 1, there is shown the layered configuration of cover body 22 (without one of the segments being in the lifted position). The cover body 22 comprises four layers of steam-permeable, disposable, rigid material such as porous paper or fibered paper such as, for example, filter paper, having fibers in an aligned configuration (grain). Each of the layers shown in FIG. 2 is configured such that the fiber alignment (grain) 36 of the material is at an angle with the fiber alignment of each other layer to provide additional strength and rigidity to the cover body 22, as well as increasing its Wet Strength. It will be understood by the skilled artisan that many inexpensive disposable materials can be used in forming the cover body 22. Materials having sorbency and steam-permeability with the ability to be treated with fire-resistant material and having a higher Wet Strength are usable. The number of segments that can be made in the body cover can be varied, depending on the application, but conveniently, at least four segments are used.

The cooking utensil cover is fire-resistant to prevent ignition and/or charring of the cover body while in use. The cooking utensil cover is formed of a steam-permeable, sorbent, flame-resistant or flame-retardant material which is able of being coated with a non-toxic substance to make it flame-resistant. Advantageously, non-toxic, fire-retardants can be used to apply to at least the top and bottom layers of the cooking utensil cover. The cooking utensil cover may be coated, for example, with a food grade non-toxic coating of zinc borate ($2ZnO\ 3B_2O_3\ 3.5H_2O$). A coating of sodium bicarbonate can also be used with the added advantage of lessening cooking odors.

The cooking utensil cover is completely disposable and may be made of a material such as sorbent paper or the like to allow the cover to be removed from the cooking utensil and completely disposed of after use.

Advantageously, a handle is attached or formed in a center portion of the cooking utensil cover to provide ease of placement and removal of the cooking utensil cover on the cooking utensil. The center portion of the cover body is advantageously reinforced to provide greater stability. Also, advantageously, at the periphery of each segment, attached to the top thereof, is a lift tab having a fastener, such as an adhesive, which allows each segment to be lifted independently one of another and fixed by means of the adhesive tab to the flip-up handle or the center portion of the cover body to retain the selected segment in its elevated position. It will be realized by the skilled artisan that a number of sorbent, disposable, fire-resistant, semi-permeable materials can be used and that numerous shapes and configurations are possible. Additionally, placement and removal handles can be located or attached as required; and, various possibilities for lift tab assemblies having fasteners exist in the prior art.

Although the method and apparatus of the present invention have been described with respect to specific embodiments thereof, various changes and modifications to the preferred embodiments may be suggested to those skilled in the art, and it is intended that the present invention encompass such changes and modifications as fall within the scope of the appended claims.

What is claimed is:

1. A disposable, segmented cover for a stovetop cooking utensil, the utensil having a cooking platform connected to upstanding sidewalls terminating at a rim and defining an interior volume comprising:

a cover body of steam-permeable, fire-resistant, sorbent, material having a wet-strength sufficient to form a rigid cover in a shape and of a dimension such that the outer periphery of the cover body is able to rest on the rim of the cooking utensil to thereby support the cover and enclose the interior volume, the cover body having a center portion and a plurality of radial slits to form at least four independently liftable segments, each forming a bendable interface with the center portion such that each segment can be elevated independently of any other segment to uncover the corresponding portion of the interior volume of the cooking utensil.

2. The disposable, segmented cover of claim 1 wherein the center portion of the body is reinforced to provide greater stability.

3. The disposable, segmented cover of claim 1 wherein the center portion contains a handle for placing and removing the cover from the cooking utensil.

4. The disposable, segmented cover of claim 3 wherein the handle comprises a flip-up handle of the same material as the cover.

5. The disposable, segmented cover of claim 1 wherein the material comprises at least two layers of steam-permeable, sorbent material bonded together, wherein at least the top and bottom layers are fire-resistant.

6. The disposable, segmented cover of claim 5 wherein the material comprises a steam-permeable, sorbent filter paper type material having an aligned fiber arrangement wherein the alignment of the fiber of each layer is at an oblique angle to that of both the previous and subsequent layer.

7. The disposable, segmented cover of claim 5 wherein the material comprises a steam-permeable, sorbent filter paper type material having an aligned fiber arrangement wherein at least the top and bottom layers are coated with sodium bicarbonate.

8. The disposable, segmented cover of claim 1 wherein each segment contains an attached lift-tab, proximate the periphery of the segment, for elevating the segment.

9. The disposable, segmented cover of claim 8 wherein the lift-tab has a fastener for maintaining the segment in an elevated position.

10. The disposable, segmented cover of claim 9 wherein the fastener comprises an adhesive.

* * * * *